US012726902B2

(12) United States Patent
Yu et al.

(10) Patent No.: US 12,726,902 B2
(45) Date of Patent: Sep. 1, 2026

(54) METHOD AND FRAME STRUCTURE FOR ULTRA-LOW POWER RECEIVERS BASED ON IEEE 802.11AH

(71) Applicant: NEWRACOM, Inc., Irvine, CA (US)

(72) Inventors: Heejung Yu, Daejeon (KR); Duk Bai Kim, Irvine, CA (US)

(73) Assignees: NEWRACOM, Inc., Irvine, CA (US); NEWRATEK, Inc., Seoul (KR)

( * ) Notice: Subject to any disclaimer, the term of this patent is extended or adjusted under 35 U.S.C. 154(b) by 342 days.

(21) Appl. No.: 18/550,649

(22) PCT Filed: May 6, 2022

(86) PCT No.: PCT/US2022/072155

§ 371 (c)(1),
(2) Date: Sep. 14, 2023

(87) PCT Pub. No.: WO2022/241387

PCT Pub. Date: Nov. 17, 2022

(65) Prior Publication Data

US 2024/0163797 A1 May 16, 2024

Related U.S. Application Data

(60) Provisional application No. 63/193,727, filed on May 27, 2021, provisional application No. 63/188,915, filed on May 14, 2021.

(51) Int. Cl.
*H04W 52/02* (2009.01)
*H04W 84/12* (2009.01)

(52) U.S. Cl.
CPC ........ *H04W 52/0229* (2013.01); *H04W 84/12* (2013.01)

(58) Field of Classification Search
CPC ............ H04W 52/0229; H04W 84/12; H04W 52/0216; H04W 52/0235
See application file for complete search history.

(56) References Cited

U.S. PATENT DOCUMENTS

2013/0177090 A1* 7/2013 Yang .................... H04L 5/0023 375/260
2013/0329702 A1* 12/2013 Yucek .............. H04W 74/0808 370/336

(Continued)

FOREIGN PATENT DOCUMENTS

EP 3731571 A1 10/2020
EP 3934319 A1 * 1/2022 ........... H04W 48/16

(Continued)

OTHER PUBLICATIONS

IEEE P802.11ax/D8.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, Oct. 2020, 820 pages.

(Continued)

*Primary Examiner* — Mohammad S Anwar
(74) *Attorney, Agent, or Firm* — Nicholson, De Vos, Webster & Elliott, LLP

(57) ABSTRACT

A method performed by a wireless device operating in a wireless network. The method includes generating a physical layer protocol data unit (PPDU) that includes a preamble portion and a data portion, wherein the preamble portion includes a signal field, wherein the signal field includes a bit that is set to binary '0' to indicate that the data portion of the PPDU includes a wake-up receiver preamble and wake-up receiver data. The method further includes wirelessly transmitting the PPDU.

20 Claims, 17 Drawing Sheets

2100

Generate a PPDU that includes a preamble portion and a data portion, wherein the preamble portion of the PPDU includes a signal field, wherein the signal field includes a (reserved) bit that is set to binary '0' to indicate that the data portion of the PPDU includes a wake-up receiver preamble and wake-up receiver data
2102

Wirelessly transmit the PPDU
2104

(56) References Cited

U.S. PATENT DOCUMENTS

| | | | | |
|---|---|---|---|---|
| 2016/0066349 | A1* | 3/2016 | Seok | H04W 74/0808 370/338 |
| 2017/0105143 | A1 | 4/2017 | Seok | |
| 2018/0115947 | A1* | 4/2018 | Kim | H04W 76/28 |
| 2019/0116554 | A1* | 4/2019 | Kristem | H04L 27/2675 |
| 2020/0037251 | A1* | 1/2020 | Du | H04W 28/065 |
| 2020/0137770 | A1* | 4/2020 | Chitrakar | H04W 72/0446 |
| 2020/0322889 | A1* | 10/2020 | Chitrakar | H04L 27/26 |

FOREIGN PATENT DOCUMENTS

| | | | | |
|---|---|---|---|---|
| WO | WO-2018016757 | A1 * | 1/2018 | H04L 27/02 |
| WO | WO-2018143580 | A1 * | 8/2018 | H04L 27/26 |
| WO | WO-2019245158 | A1 * | 12/2019 | H04W 48/08 |

OTHER PUBLICATIONS

IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.

IEEE Std 802.11-2016: "Part 11: Wireless LAN Medium Access Control (MAC) and Physical Layer (PHY) Specifications," IEEE Standard for Information technology—Telecommunicationsand information exchange between systems, Local and metropolitan area networks—Specific requirements, Dec. 7, 2016, 3534 pages.

IEEE Std 802.11a, "Part 11: Wireless LAN Medium Access Control (MAC) and Physical Layer (PHY) specifications: High-speed Physical Layer in the 5 GHZ Band", 1999, 90 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 Ghz," IEEE Standard for Information technology—Telecommunications and information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, Dec. 7, 2016, 594 pages.

IEEE Std 802.11b-1999: "Higher Speed Physical Layer (PHY) Extension in the 2.4 GHz Band," IIEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

IEEE Std 802.11p-2010 Part 11: Wireless LAN Medium Access Control (MAC) and Physical Layer (PHY) Specifications, Amendment 6: Wireless Access in Vehicular Environments, IEEE Standard for Information technology—Telecommunications and information exchange between systems, Local and metropolitan area networks—Specific requirements, Jul. 15, 2010, 51 pages.

IEEE Std P802.11bd/D1.1, Part 11: Wireless LAN Medium Access Control (MAC) and Physical Layer (PHY) Specifications, Amendment 5: Enhancements for Next Generation Vehicular Communication, IEEE Draft Standard for Information technology—Telecommunications and information exchange between systems, Local and metropolitan area networks—Specific requirements, Dec. 2020, 102 pages.

International Search Report and Written Opinion, PCT App. No. PCT/US2022/072155, Aug. 9, 2022, 10 pages.

Office Action, KR App. No. 10-2023-7037493, Apr. 10, 2026, 16 pages (08 pages of English Translation and 08 pages of Original Document).

* cited by examiner

| | |
|---|---|
| Frequency Band | License-exempt bands below 1 GHz, excluding the TV white spaces |
| Channel Width | 1/2/4/8/16 MHz |
| Modulation Schemes | BPSK, QPSK, 16-QAM, 64-QAM, 256-QAM |
| Maximum Number of Spatial Streams | Four spatial streams |
| Range | Up to 1Km (outdoor) |
| End Node Transmit Power | Dependent on regional regulations (from 1 mW to 1 W) |
| Packet Size | Up to 7,991 bytes (without aggregation) up to 65,535 bytes (with aggregation) |
| Data Rate | 150 kb/s (1 MHz channel bandwidth, 1 spatial stream, BPSK, 1/2 coding rate, repetition coding) to 347 Mb/s (16 MHz channel bandwidth, 4 spatial streams, 256 QAM, 5/6 coding rate) |
| Number of Stations | Up to 6000 |
| Location | Indoor and outdoor |
| Traffic Type | Periodic packet transmission every few to tens minutes |

FIG. 6

S1G1_SHORT PPDU format

S1G1_LONG PPDU format

S1G1_1M PPDU format

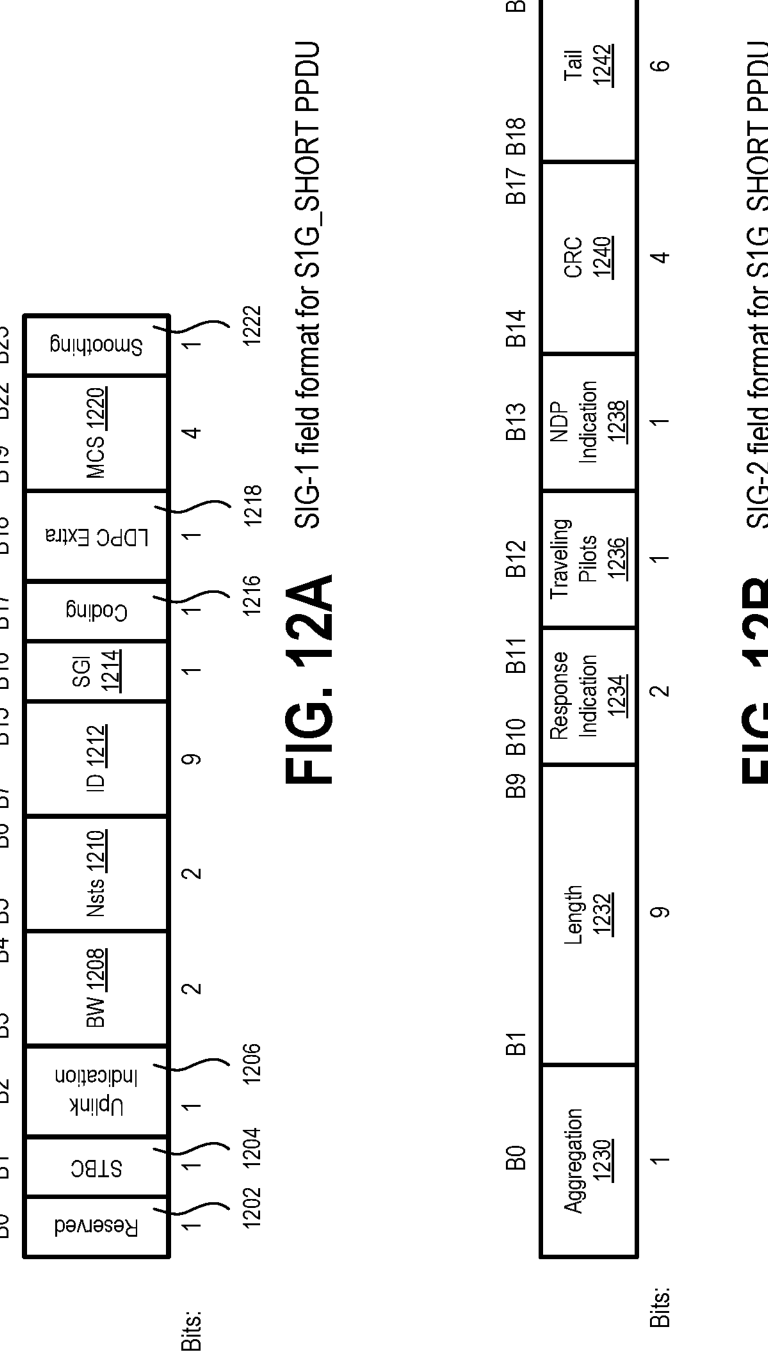
FIG. 12A SIG-1 field format for S1G_SHORT PPDU
FIG. 12B SIG-2 field format for S1G_SHORT PPDU SIG-A-1 field format for S1G_LONG SU PPDU SIG-A-2 field format for S1G_LONG SU PPDU SIG field format for S1G_1M PPDU Reserved bit = 0
STF
1602
LTF1
1604
SIG
1606
WUR-Preamble
1608
WUR-Data
1610
2 MHz
< 2 MHz
Wake-up receiver PPDU format corresponding to S1G_SHORT format Reserved bit = 0
STF
1702
LTF1
1704
SIG-A
1706
WUR-Preamble
1708
WUR-Data
1710
2 MHz
< 2 MHz
Wake-up receiver PPDU format corresponding SIG1_LONG format Reserved bit = 0
STF
1802
LTF1
1804
SIG
1806
WUR-Preamble
1808
WUR-Data
1810
1 MHz
< 1 MHz
Wake-up receiver PPDU format corresponding to SIG1_1M format

2100

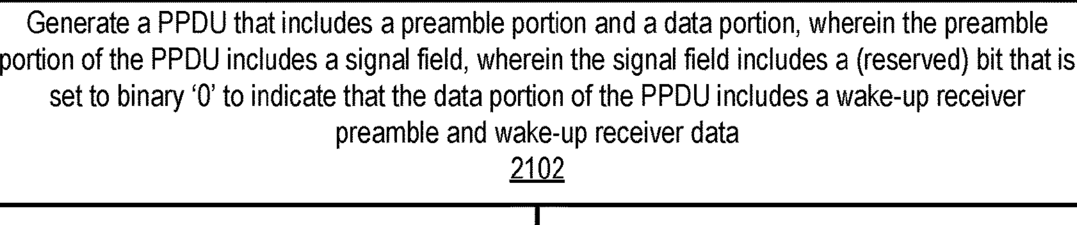

Wirelessly transmit the PPDU
2104

Receive a PPDU that includes a preamble portion and a data portion, wherein the preamble portion of the PPDU includes a signal field that includes a (reserved) bit that is set to binary ‘0’ to indicate that the data portion of the PPDU includes wake-up receiver data
2202

Refrain from decoding the data portion of the PPDU in response to a determination that the (reserved) bit is set to binary ‘0’
2204

FIG. 22

METHOD AND FRAME STRUCTURE FOR ULTRA-LOW POWER RECEIVERS BASED ON IEEE 802.11AH

CROSS-REFERENCE TO RELATED APPLICATION

This application is the National stage of International Application No. PCT/US2022/072155, filed May 6, 2022, which claims the benefit of U.S. Provisional Application No. 63/188,915, filed May 14, 2021, titled, "METHOD AND FRAME STRUCTURE FOR ULTRA-LOW POWER RECEIVERS BASED ON IEEE 802.11AH" and U.S. Provisional Application No. 63/193,727, filed May 27, 2021, titled, "METHOD AND FRAME STRUCTURE FOR ULTRA-LOW POWER STAND-BY RADIO BASED ON IEEE 802.11AH," which are hereby incorporated by reference.

TECHNICAL FIELD

The present disclosure generally relates to wireless communications, and more specifically, relates to reducing power consumption in a wireless network.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

The IEEE 802.11 ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

The IEEE 802.11 ah standard offers various low power features. However, they are not adequate in some application that require ultra-low power consumption as well as low latency time at the same time during the power save mode.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table listing various characteristics of 802.11ah, according to some embodiments.

FIG. 12A is a diagram showing a SIG-1 field format for an Institute of Electrical and Electronics Engineers (IEEE) 802.11ah S1G_SHORT PPDU, according to some embodiments.

FIG. 12B is a diagram showing a SIG-2 field format for an IEEE 802.11ah S1G_SHORT PPDU, according to some embodiments.

FIG. 21 is a diagram showing a method for transmitting a wake-up receiver PPDU, according to some embodiments.

FIG. 22 is a diagram showing a method for receiving and processing a wake-up receiver PPDU, according to some embodiments.

DETAILED DESCRIPTION

Figure 1:
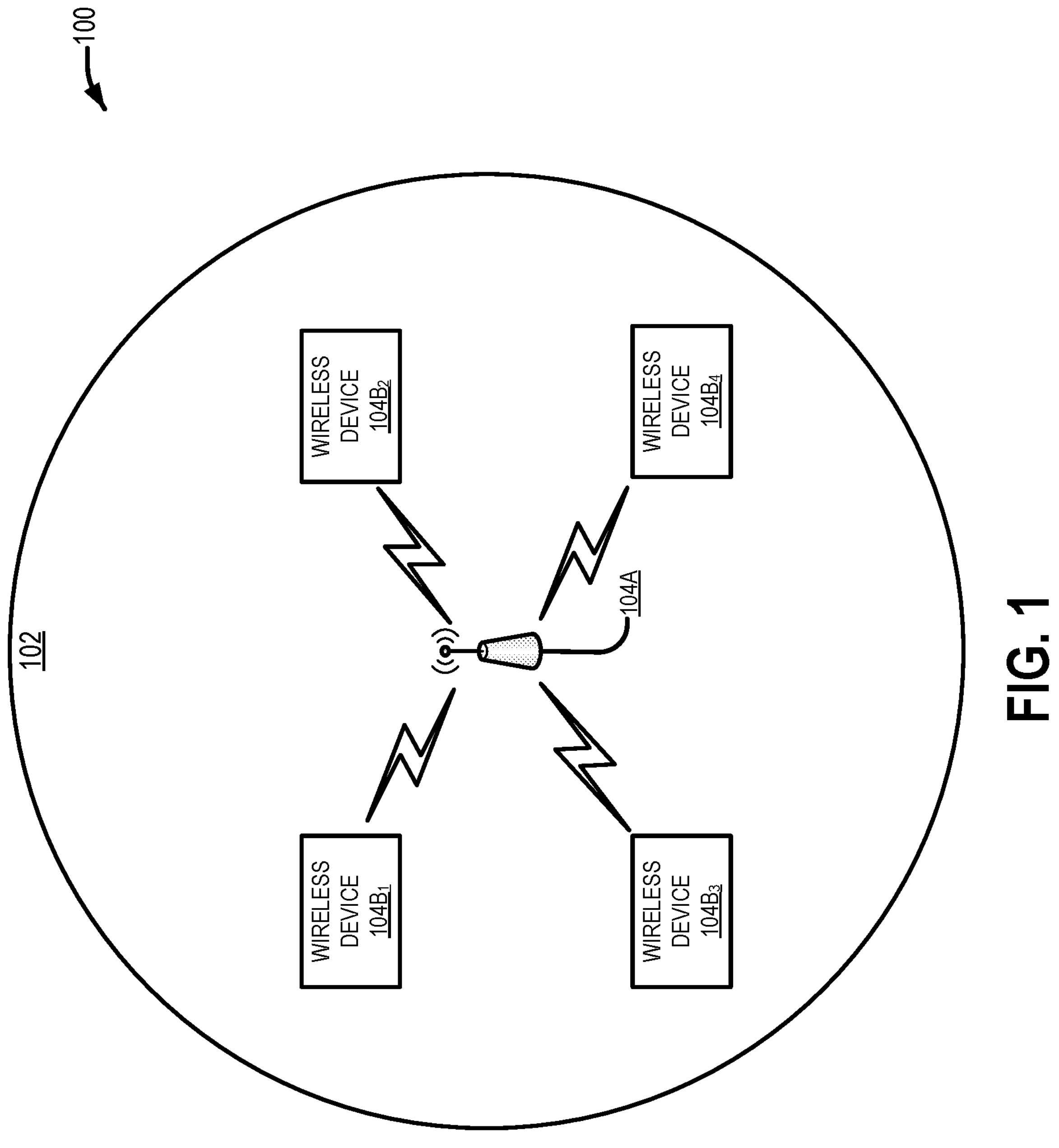
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to reducing power consumption in a wireless network.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104$B_1$-104$B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104$B_1$-104$B_4$) may be collectively referred to as STAs. However, for ease of description, only the non-AP STAs may be referred to as STAs. Although shown with four non-AP STAs (e.g., the wireless devices 104$B_1$-104$B_4$), the WLAN 100 may include any number of non-AP STAs (e.g., one or more wireless devices 104B).

Figure 2:
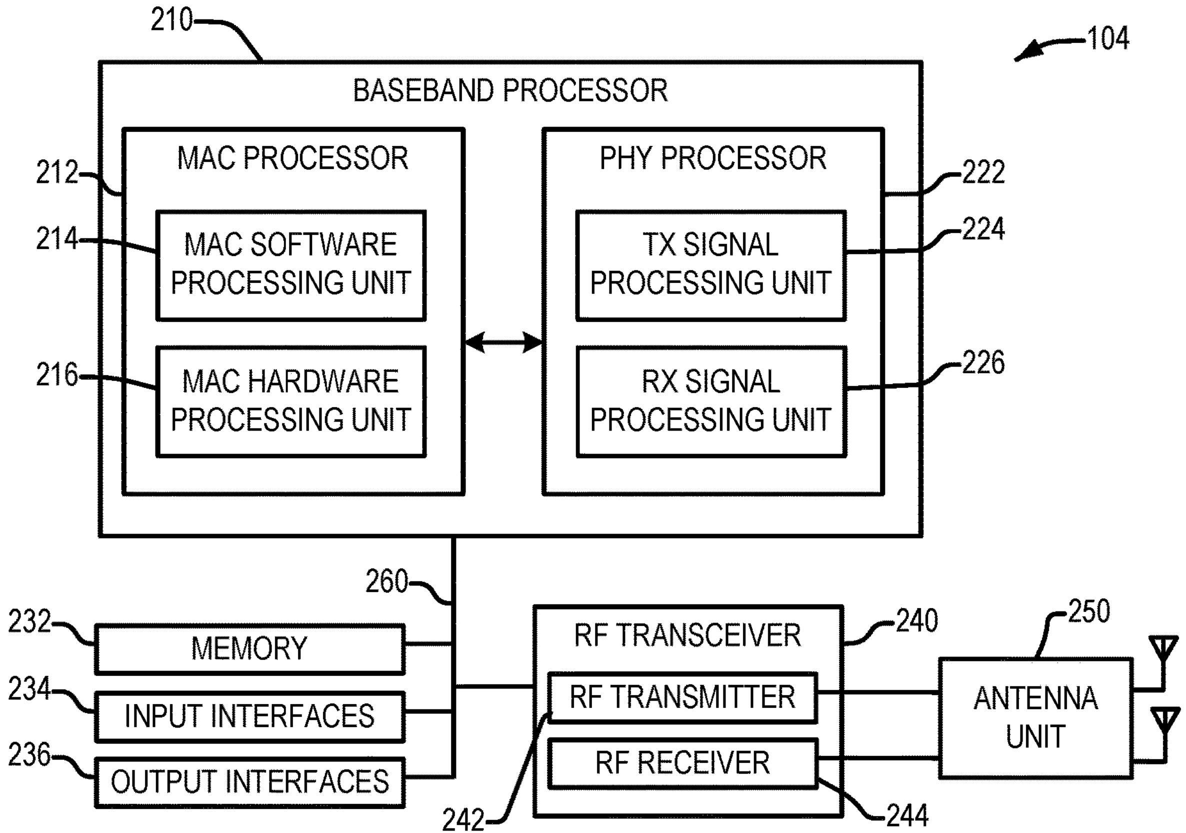
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104$B_1$-104$B_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figures 3A, 3B:
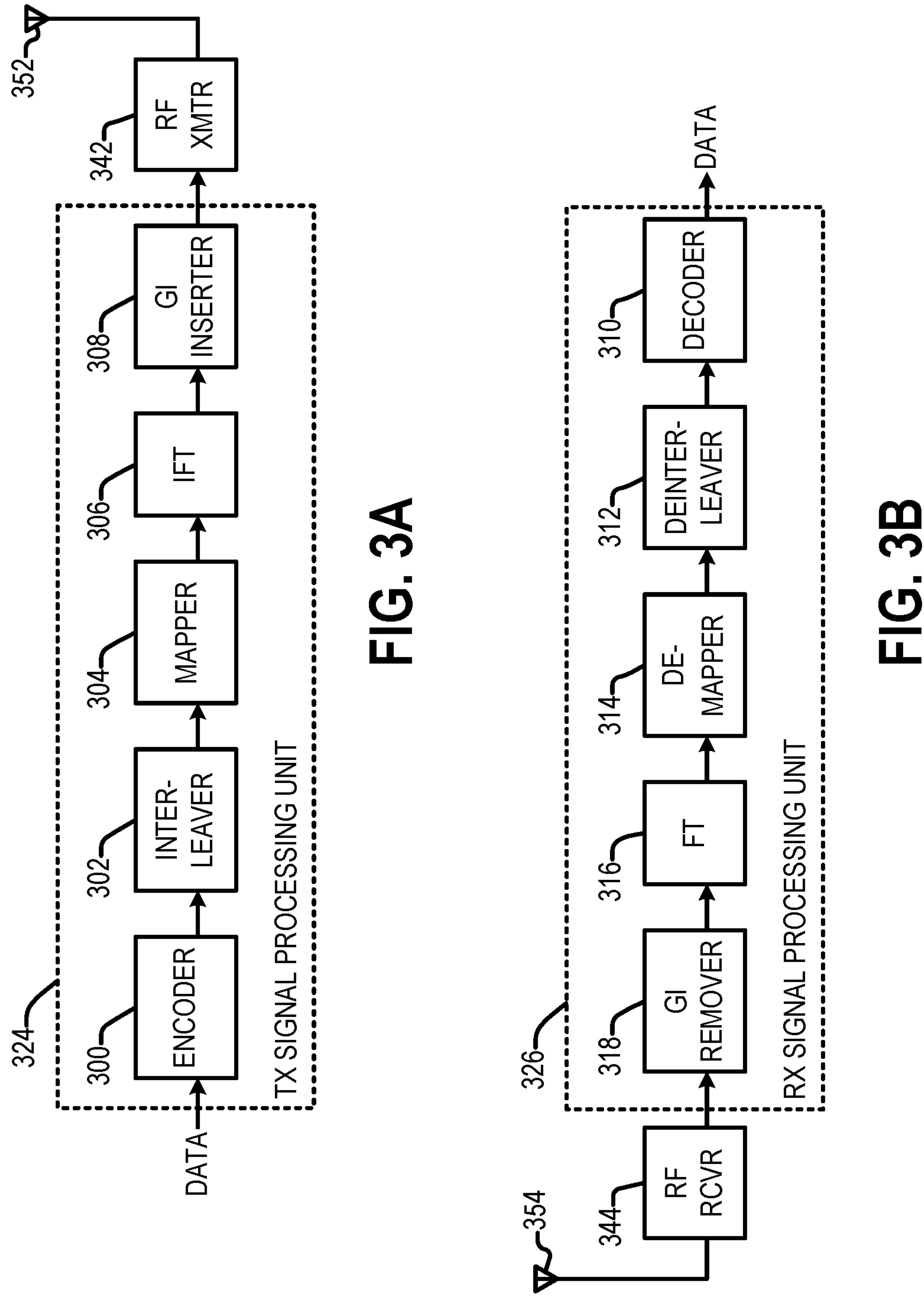
FIG. 3A illustrates components of a wireless device configured to transmit data, in accordance with some embodiments of the present disclosure.
FIG. 3B illustrates components of a wireless device configured to receive data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
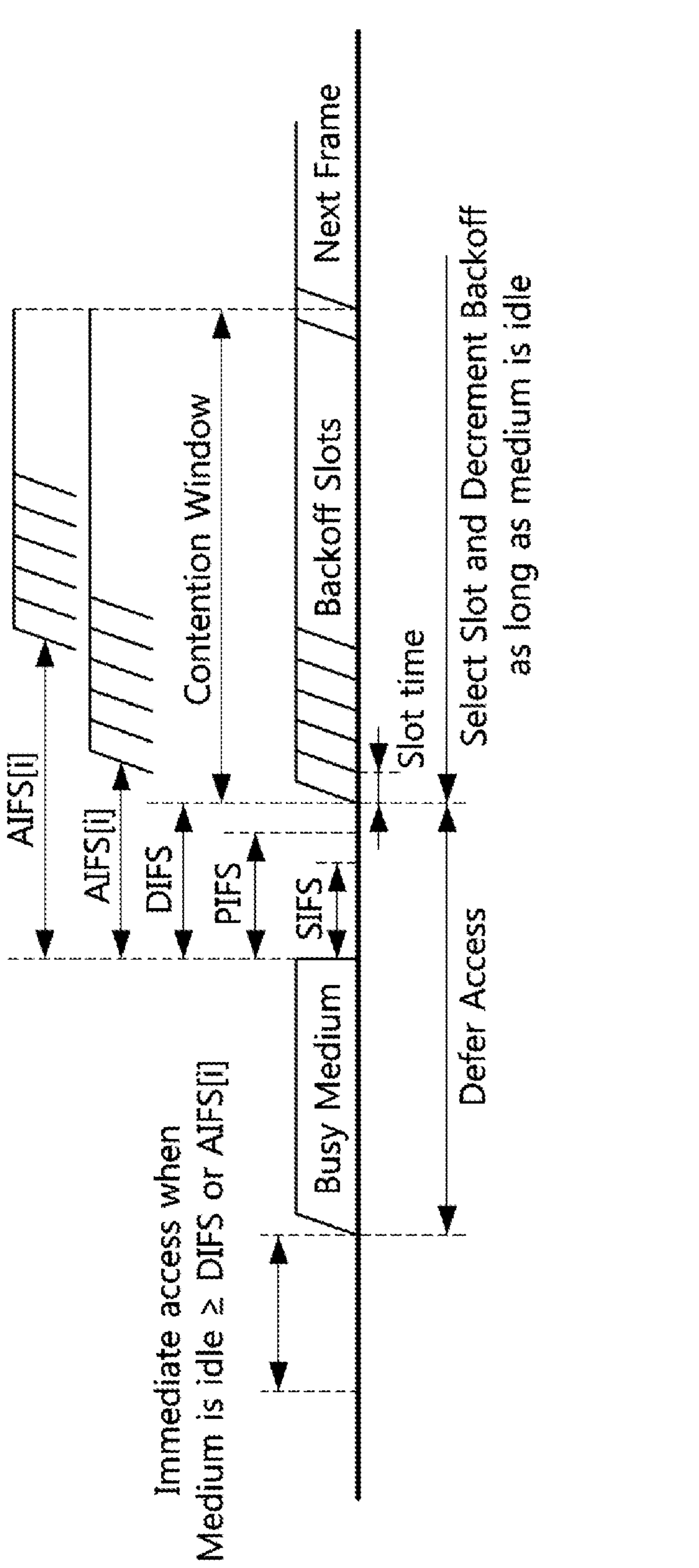
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
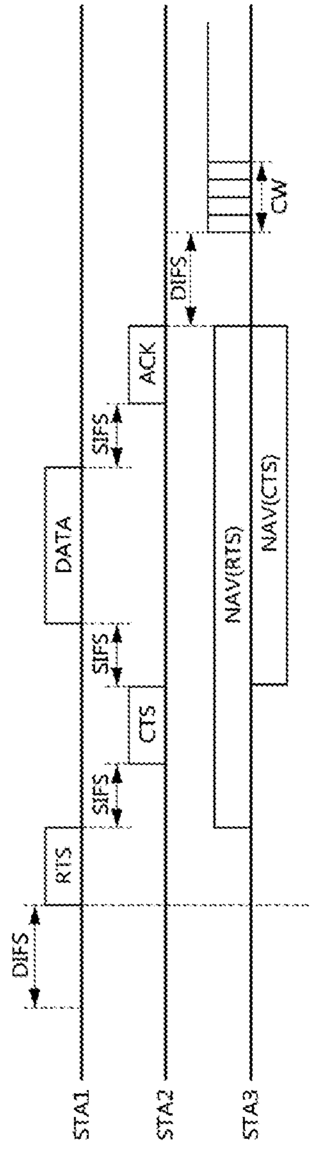
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

As mentioned above, the IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

Although S1G bands have more limited frequency spectrum available than 2.4 and 5 GHz ISM bands, the basic assumption is it would be sufficient enough for low data rate applications such as IoT applications. IoT applications typically transmit small amounts of data infrequently. Moreover, since the 915 MHz ISM band (902-928 MHz) has 8.5 dB less free space propagation loss than 2.4 GHz ISM band, this could allow to enhance either the link budget between devices or long-range transmission for outdoor circumstances. Those properties can help reduce energy consumption of a device by lowering transmit power as well.

FIG. 6 shows a table listing various characteristics of 802.11ah, according to some embodiments. Even though the IEEE 802.11ah standard provides power saving features for IoT networks, some application areas such as sensor networks require ultra-low power operation to further extend network lifetime (operation time). In order to support ultra-low power operation, an addition transmission scheme, which consumes with very low power, can be employed in addition to the standard IEEE 802.11ah transmission scheme. One such transmission scheme is an on-off keying (OOK) scheme with narrow bandwidth. An OOK signal can be demodulated with non-coherent detection with simple timing synchronization. Instead of using a complicated channel coding approach, a repetition (or spreading) scheme can be used to obtain the same communication range as the lowest modulation and coding scheme (MCS) of IEEE 802.11ah. The concept of a low-power wake-up receiver has been discussed in the standardization efforts of IEEE 802.11. In this concept, the communications subsystems include a main radio (e.g., IEEE 802.11ah) and a low-power wake-up receiver (also referred to simply as a "wake-up receiver" or "WUR"). The wake-up receiver may operate in the sub-1 GHz band (instead of the 2.4 GHz and 5 GHz bands).

In this concept, the main radio (e.g., IEEE 802.11ah) is used for user data transmission and reception. The main radio is turned off unless there is data for it to transmit or receive. The wake-up receiver wakes up the main radio if it receives a wake-up signal from an AP and there is data for the main radio to receive. Once the wake-up receiver wakes up the main radio, user data is transmitted and received by the main radio. The wake-up receiver is not used for user data transmission/reception in general but serves as a "wake-up" receiver for the main radio. For this purpose, the wake-up receiver may be a relatively simple receiver. Also, the wake-up receiver may be active while the main radio is turned off. The design of the wake-up receiver may be simple such that its target power consumption is much lower than that of the main radio (e.g., the target power consumption may be less than 100 uW when active). To achieve this goal, the wake-up receiver may use simple modulation schemes such as OOK with repetition (or spreading) schemes instead of complicated modulation schemes that require coherent detection and channel coding schemes.

Figures 7, 8:
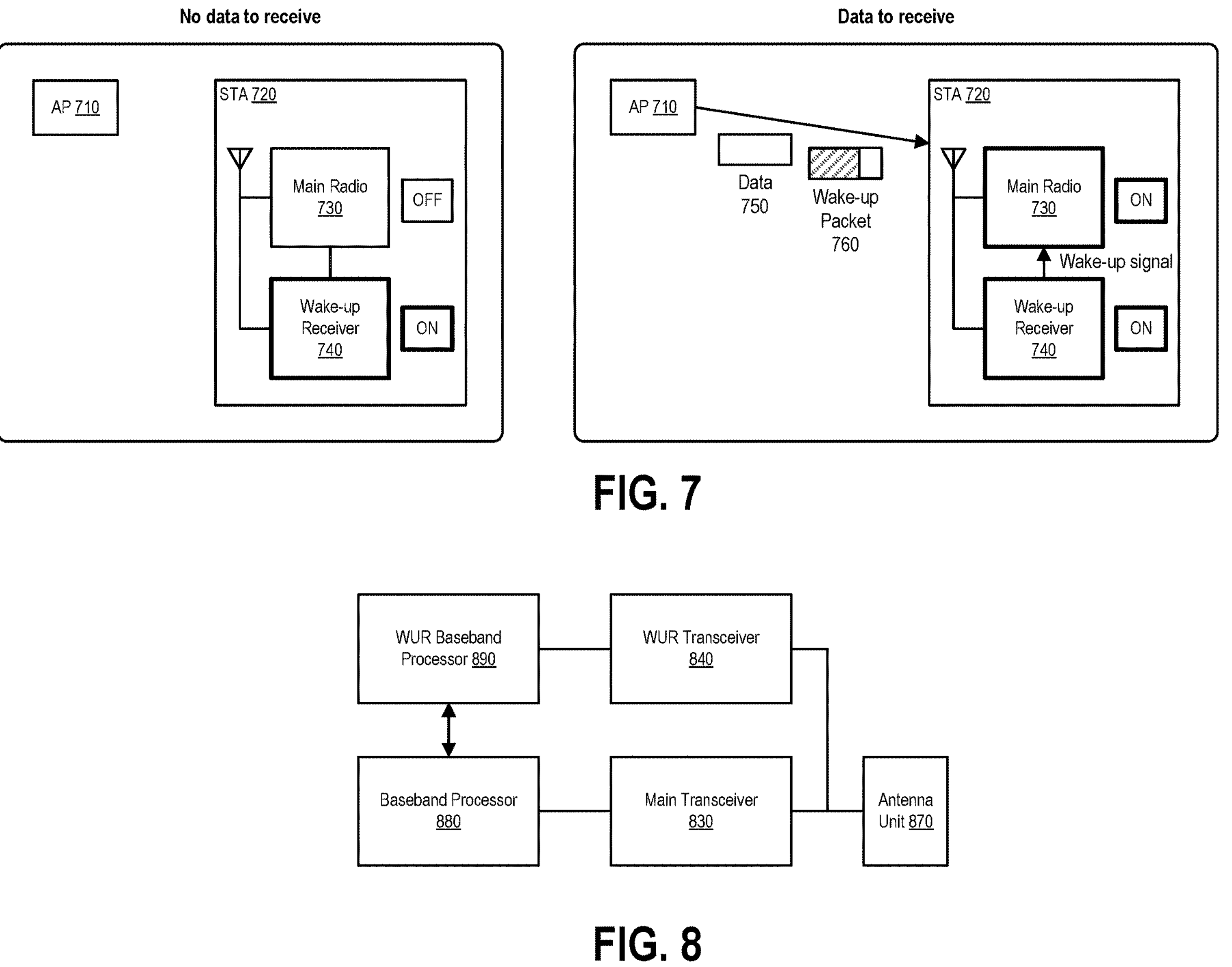
FIG. 7 is a diagram showing operational examples of a low-power wake-up receiver when there is data to receive and when there is no data to receive, according to some embodiments.
FIG. 8 is a diagram showing components of an 802.11ah STA that supports wake-up receiver operations, according to some embodiments.

FIG. 7 is a diagram showing operational examples of a low-power wake-up receiver when there is data to receive and when there is no data to receive, according to some embodiments. As shown in the diagram, when there is no data to receive, the wake-up receiver 740 of the STA 720 is active (it is turned "ON") while the main radio 730 (e.g., an 802.11ah radio) of the STA 720 is turned off (it is turned "OFF") or in a low-power state. This is an example where the STA 720 is in a power-save mode to reduce power consumption. However, when the AP 710 has data 750 to send to the STA 720, the AP may first send a wake-up signal in the form of a wake-up packet (WUP) 760 which is transmitted using a new waveform such as OOK. The wake-up receiver 740 of the STA 720 may receive this wake-up packet 760. Responsive to receiving this wake-up packet 760, the wake-up receiver 740 of the STA 720 may wake up the main radio 730 of the STA 720 (turn the main radio 730 on) so that the main radio 730 becomes active. After the main radio 730 of the STA is active, the AP may send data 750 to the STA (e.g., using 802.11ah), which is received by the main radio 730 of the STA 720. The STA 720 is said to be in an active mode when its main radio 730 is active.

FIG. 8 is a diagram showing components of an 802.11ah STA that supports wake-up receiver operations, according to some embodiments. As shown in the diagram, a wake-up receiver (WUR) transceiver 840 and a main transceiver 830 are coupled to an antenna unit 870. In an embodiment, the main transceiver 830 is an 802.11ah transceiver. The main transceiver 830 is coupled to a baseband processor 880. The WUR transceiver 840 is coupled to a WUR baseband processor 890. The WUR baseband processor 890 is coupled to the baseband processor 880.

Figures 9, 10, 11:
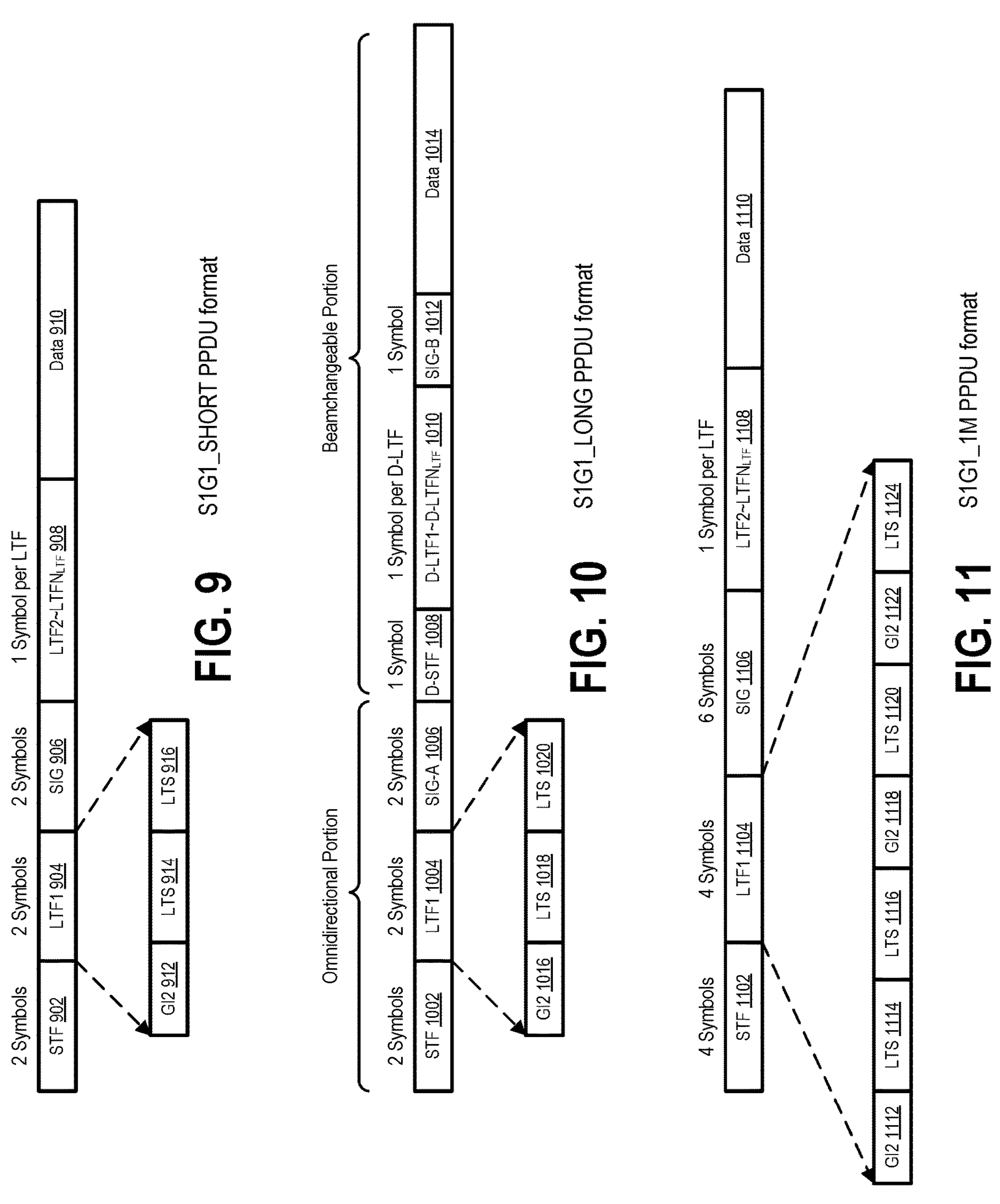
FIG. 9 is a diagram showing a SIG_SHORT physical layer protocol data unit (PPDU) format, according to some embodiments.
FIG. 10 is a diagram showing a S1G_LONG PPDU format, according to some embodiments.
FIG. 11 a diagram showing a S1G_1M PPDU format, according to some embodiments.

When a wake-up signal is transmitted, legacy wireless devices (e.g., wireless devices that do not have wake-up receivers) should defer their transmissions to allow wake-up receivers to receive the wake-up signal correctly. To this end, it is desirable that the legacy wireless devices be able to recognize when a wake-up signal is being transmitted. In an embodiment, to allow legacy wireless devices to recognize a wake-up signal, a wake-up signal that is based on the legacy IEEE 802.11ah PPDU format can be used. FIGS. 9-11 show various PPDU formats in IEEE 802.11 ah including a S1G_SHORT PPDU format, S1G_LONG PPDU format, and S1G_1M PPDU format. Various features and formats are described herein in the context of 802.11 standards using terminology of 802.11 standards. Certain details (e.g., the details of certain fields/subfields and their purpose) are omitted herein for sake of conciseness and to avoid obscuring the description.

FIG. 9 is a diagram showing a S1G_SHORT PPDU format, according to some embodiments. As shown in the diagram, the S1G_SHORT PPDU format includes a STF field 902 (2 symbols), a LTF1 field 904 (2 symbols), a SIG field 906 (2 symbols), LTF2~LTFN$_{LTF}$ fields 908 (1 symbol per LTF), and a data field 910. The LTF1 field 904 includes a GI2 field 912, a LTS field 914, and a LTS field 916.

FIG. 10 is a diagram showing a S1G_LONG PPDU format, according to some embodiments. As shown in the diagram, the S1G_LONG PPDU format includes a STF field 1002 (2 symbols), a LTF1 field 1004 (2 symbols), a SIG-A field 1006 (2 symbols), a D-STF field 1008, D-LTFI~D-LTFN$_{LTF}$ fields 1010 (1 symbol per D-LTF), a SIG-B field 1012 (1 symbol), and a data field 1014. The LTF1 field 1004 includes a GI2 field 1016, a LTS field 1018, and a LTS field 1020. The STF field 1002, LTF1 field 1004, and SIG-A field 1006 may form the omnidirectional portion while the D-STF field 1008, D-LTF~D-LTFN$_{LTF}$ fields 1010, SIG-B field 1012, and data field 1014 may form the beamchangeable portion.

FIG. 11 a diagram showing a S1G_1M PPDU format, according to some embodiments. As shown in the diagram, the S1G_1M format includes a STF field 1102 (4 symbols), a LTF1 field 1104 (4 symbols), a SIG field 1106 (6 symbols), LTF2~LTFN$_{LTF}$ fields 1108 (1 symbol per LTF), and a data field 1110. The LTF1 field 1104 includes a GI2 field 1112, a LTS field 1114, a LTS field 1116, a GI2 field 1118, a LTS field 1120, a GI2 field 1122, and a LTS field 1124.

In each frame format, the SIG field or SIG-A field may include information of the corresponding transmission such as length, MCS, number of space-time streams, and so on. FIGS. 12-15 show the SIG field (or SIG-A field) formats for S1G_SHORT, S1G_LONG single user (SU), S1G LONG multi-user (MU), and S1G_1M PPDUs, respectively. In this and other diagrams bit positions are represented as Bn, where n represents the position.

FIG. 12A is a diagram showing a SIG-1 field format for an IEEE 802.11ah S1G_SHORT PPDU, according to some embodiments. As shown in the diagram, the SIG-1 field format includes a reserved field 1202, a STBC field 1204, an uplink indication field 1206, a BW field 1208, a Nsts field 1210, a ID field 1212, a SGI field 1214, a coding field 1216, a LDPC extra field 1218, a MCS field 1220, and a smoothing field 1222.

FIG. 12B is a diagram showing a SIG-2 field format for an IEEE 802.11ah S1G_SHORT PPDU, according to some embodiments. As shown in the diagram, the S1G-2 field format includes an aggregation field 1230, a length field 1232, a response indication field 1234, a traveling pilots field 1236, a NDP indication field 1238, a CRC field 1240, and a tail field 1242.

Figures 13A, 13B:
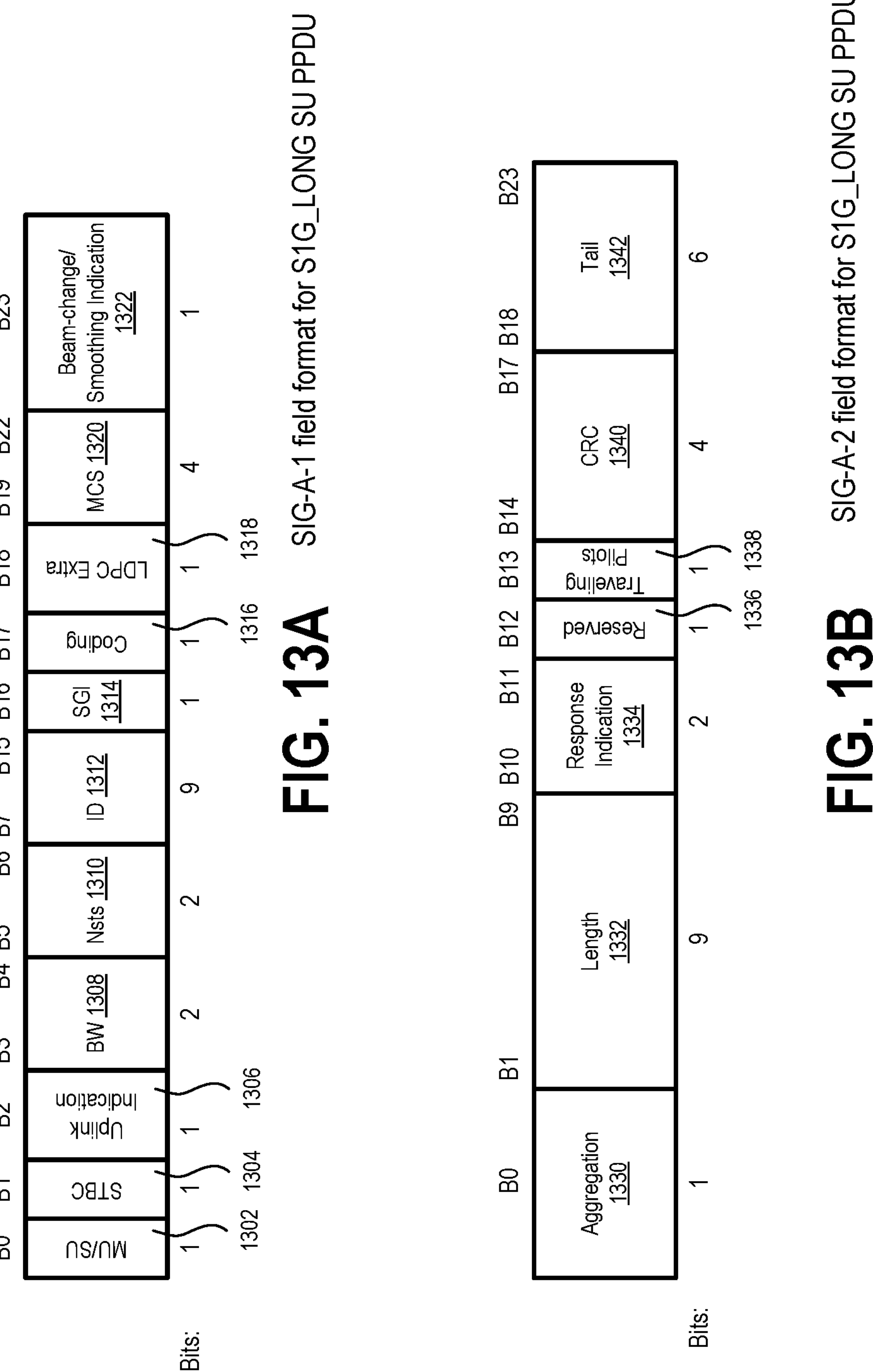
FIG. 13A is a diagram showing a SIG-A-1 field format for an IEEE 802.11ah S1G_LONG SU PPDU, according to some embodiments.
FIG. 13B is a diagram showing a SIG-A-2 field format for an IEEE 802.11ah S1G_LONG SU PPDU, according to some embodiments.

FIG. 13A is a diagram showing a SIG-A-1 field format for an IEEE 802.11ah S1G_LONG SU PPDU, according to some embodiments. As shown in the diagram, the SIG-A-1 field format includes a MU/SU field 1302, a STBC field 1304, an uplink indication field 1306, a BW field 1308, a Nsts field 1310, an ID field 1312, a SGI field 1314, a coding field 1316, a LDPC extra field 1318, a MCS field 1320, and a beam-change/smoothing indication field 1322.

FIG. 13B is a diagram showing a SIG-A-2 field format for an IEEE 802.11ah S1G_LONG SU PPDU, according to some embodiments. As shown in the diagram, the SIG-A-2 field format includes an aggregation field 1330, a length field 1332, a response indication field 1334, a reserved field 1336, a traveling pilots field 1338, a CRC field 1340, and a tail field 1342.

Figures 14A, 14B:
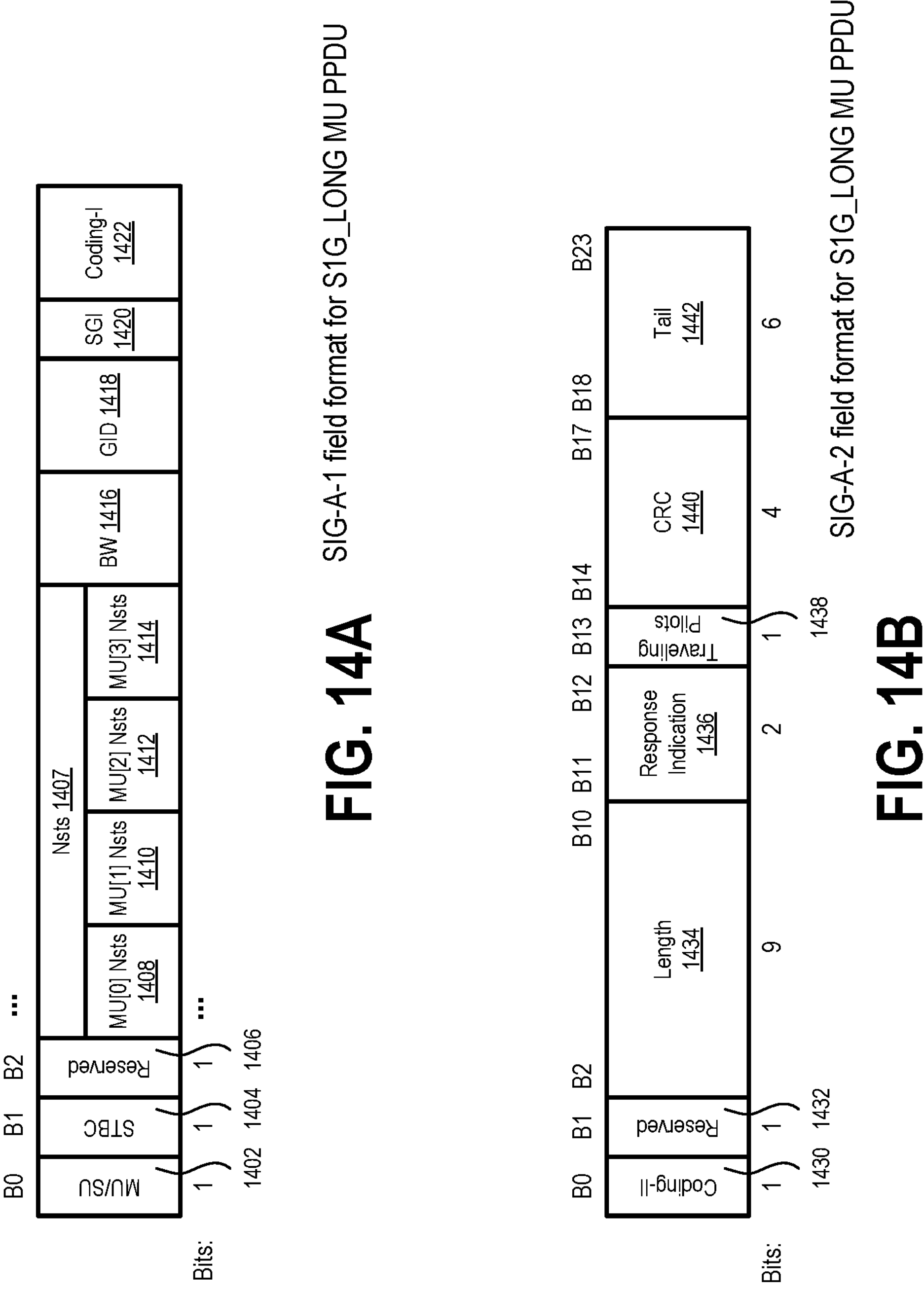
FIG. 14A is a diagram showing a SIG-A-1 field format for an IEEE 802.11ah S1G_LONG MU PPDU, according to some embodiments.
FIG. 14B is a diagram showing a SIG-A-2 field format for an IEEE 802.11ah S1G_LONG MU PPDU, according to some embodiments.

FIG. 14A is a diagram showing a SIG-A-1 field format for an IEEE 802.11ah S1G_LONG MU PPDU, according to some embodiments. As shown in the diagram, the SIG-A-1 field format includes a MU/SU field 1402, a STBC field 1404, a reserved field 1406, a Nsts field 1407 (which includes a MU[0] Nsts field 1408, a MU[1] Nsts field 1410, a MU[2] Nsts field 1412, and a MU[3] Nsts field 1414), a BW field 1416, a GID field 1418, a SGI field 1420, and a coding-I field 1422.

FIG. 14B is a diagram showing a SIG-A-2 field format for an IEEE 802.11ah S1G_LONG MU PPDU, according to some embodiments. As shown in the diagram, the S1G-A-2 field format includes a coding-II field 1430, a reserved field 1432, a length field 1434, a response indication field 1436, a traveling pilots field 1438, a CRC field 1440, and a tail field 1442.

Figure 15:
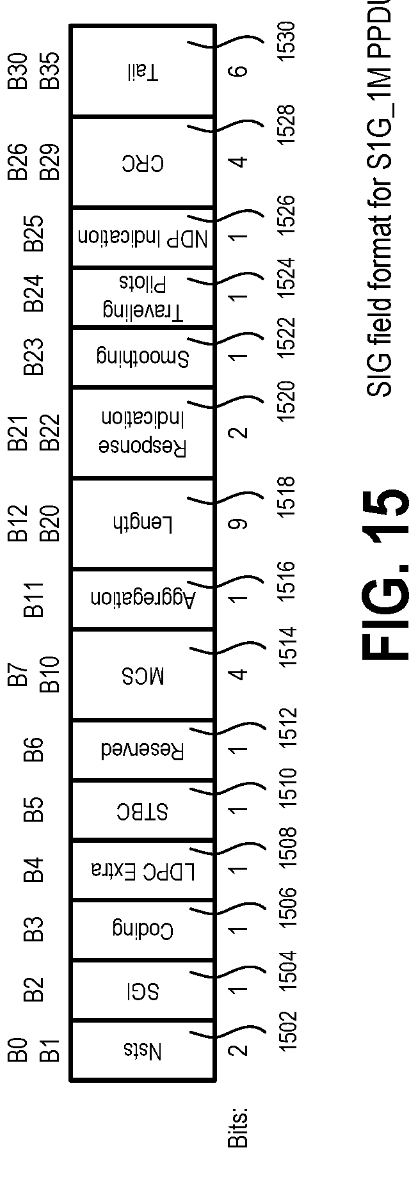
FIG. 15 is a diagram showing a SIG field format for an IEEE 802.11ah S1G_1M PPDU, according to some embodiments.

FIG. 15 is a diagram showing a SIG field format for an IEEE 802.11ah S1G_1M PPDU, according to some embodiments. As shown in the diagram, the SIG field format includes a Nsts field 1502, a SGI field 1504, a coding field 1506, a LDPC extra field 1508, a STBC field 1510, a reserved field 1512, a MCS field 1514, an aggregation field 1516, a length field 1518, a response indication field 1520, a smoothing field 1522, a traveling pilots field 1524, a NDP indication field 1526, a CRC field 1528, and a tail field 1530.

The present disclosure introduces a wake-up receiver PPDU format that is based on the IEEE 802.11ah standard and associated receiver operations that allow for reducing power consumption in wireless networks, which helps prolong the lifetime of wireless networks.

Figures 16, 17, 18:
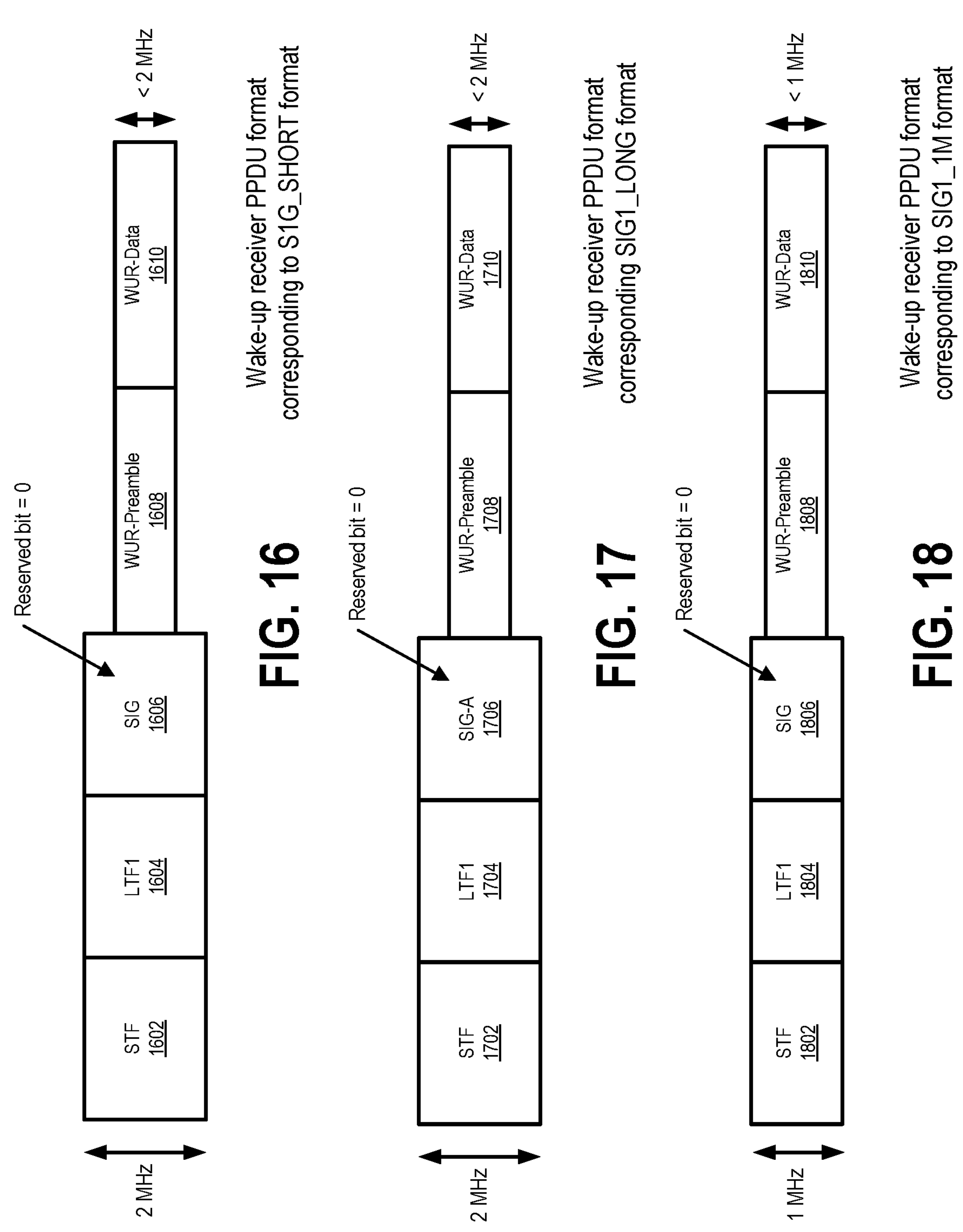
FIG. 16 is a diagram showing a wake-up receiver PPDU format corresponding to S1G_SHORT format, according to some embodiments.
FIG. 17 is a diagram showing a wake-up receiver PPDU format corresponding to S1G-LONG format, according to some embodiments.
FIG. 18 is a diagram showing a wake-up receiver PPDU format corresponding to S1G_1M format, according to some embodiments.

The data transmission scheme for wake-up receiver should be backwards compatible with existing IEEE 802.11ah systems. Backwards compatibility can be achieved by using a legacy preamble as part of the data transmission. In an embodiment, to distinguish from the legacy IEEE 802.11 ah PPDU which has a reserved bit that is set to binary '1', the proposed wake-up receiver PPDU includes the same/similar preamble as the legacy IEEE 802.11 ah PPDU except the reserved bit in the SIG field (or SIG-A field) is set to be binary '0'. FIGS. 16-18 show wake-up receiver PPDU formats corresponding to S1G_SHORT, S1G_LONG, and S1G_1M, respectively.

FIG. 16 is a diagram showing a wake-up receiver PPDU format corresponding to S1G_SHORT format, according to some embodiments. As shown in the diagram, the PPDU format includes a STF field 1602, a LTF1 field 1604, a SIG field 1606, a wake-up receiver preamble portion 1608, and a wake-up receiver data portion 1610. As shown in the diagram, in an embodiment, the reserved bit (e.g., bit B0) in the SIG field 1606 is set to binary '0' to indicate that the data portion of the PPDU includes a wake-up receiver preamble and wake-up receiver data. In an embodiment, the STF field 1602, the LTF1 field 1604, and the SIG field 1606 (the preamble portion of the PPDU) are transmitted using a first bandwidth (e.g., ~2 MHz), while the wake-up receiver preamble portion 1608 and the wake-up receiver data portion 1610 (the data portion of the PPDU) are transmitted using a second bandwidth that is less than the first bandwidth (e.g., less than 2 MHz). In an embodiment, the wake-up receiver preamble portion 1608 and the wake-up receiver data portion 1610 are transmitted using an OOK modulation scheme immediately following transmission of the SIG field 1606.

FIG. 17 is a diagram showing a wake-up receiver PPDU format corresponding to S1G_LONG format, according to some embodiments. As shown in the diagram, the PPDU format includes a STF field 1702, a LTF1 field 1704, a SIG-A field 1706, a wake-up receiver preamble portion 1708, and a wake-up receiver data portion 1710. As shown in the diagram, in an embodiment, the reserved bit in the SIG-A field 1706 is set to binary '0' to indicate that the data portion of the PPDU includes a wake-up receiver preamble and wake-up receiver data. In an embodiment, the STF field 1702, the LTF1 field 1704, and the SIG field 1706 (the preamble portion of the PPDU) are transmitted using a first bandwidth (e.g., –2 MHz), while the wake-up receiver preamble portion 1708 and the wake-up receiver data portion 1710 (the data portion of the PPDU) are transmitted using a second bandwidth that is less than the first bandwidth (e.g., less than 2 MHz). In an embodiment, the wake-up receiver preamble portion 1708 and the wake-up receiver data portion 1710 are transmitted using an OOK modulation scheme immediately following transmission of the SIG-A field 1706. IEEE 802.11ah defines two different S1G LONG PPDU formats: SU and MU. In the S1G LONG SU PPDU format, the reserved bit may be bit B12 in the SIG-A-2 symbol. In the S1G_LONG MU PPDU format, the reserved bits may be bit B2 in the SIG-A-1 symbol and bit B1 in the SIG-A-2 symbol. Thus, in an embodiment, one of these bits or both of these bits can be used to indicate that the data portion of the PPDU includes a wake-up receiver preamble and wake-up receiver data.

FIG. 18 is a diagram showing a wake-up receiver PPDU format corresponding to S1G_1M format, according to some embodiments. As shown in the diagram, the PPDU format includes a STF field 1802, a LTF1 field 1804, a SIG field 1806, a wake-up receiver preamble portion 1808, and a wake-up receiver data portion 1810. As shown in the diagram, in an embodiment, the reserved bit (e.g., bit B6) in the SIG field 1806 is set to binary '0' to indicate that the data portion of the PPDU includes a wake-up receiver preamble and wake-up receiver data. In an embodiment, the STF field 1802, the LTF1 field 1804, and the SIG field 1806 (the preamble portion of the PPDU) are transmitted using a first bandwidth (e.g., ~1 MHz), while the wake-up receiver preamble portion 1808 and the wake-up receiver data portion 1810 (the data portion of the PPDU) are transmitted using a second bandwidth that is less than the first bandwidth (e.g., less than 1 MHz). In an embodiment, the wake-up receiver preamble portion 1808 and the wake-up receiver data portion 1810 are transmitted using an OOK modulation scheme immediately following transmission of the SIG field 1806.

The operation of wireless devices that receive a PPDU having the new wake-up receiver PPDU format is now descried. The receiver operation may depend on the type and current operation mode of the receiver. For a legacy wireless device that does not support wake-up receiver functionality, if the legacy wireless device successfully decodes the legacy portion of the PPDU including the STF field, LTF field, and SIG field (or SIG-A field) (e.g., the check of the CRC in the SIG field or SIG-A field is valid), then the legacy wireless device maintains the PHY-CCA busy state for the predicted transmission duration of the PPDU (e.g., as defined by RXTIME calculated based on S1G or SIG-A information in the IEEE 802.11ah standard). In an embodiment, since the reserved bit is set to binary '0' (instead of binary '1'), the legacy wireless device may decide not to decode the signal that comes after the SIG field or SIG-A field to save power (this may depend on implementation).

A new wireless device that supports wake-up receiver functionality and that is in the active mode (e.g., both the IEEE 802.11ah main radio and wake-up receiver are active, as shown in the right side of FIG. 7) can also decode the legacy portion of the PPDU and recognize that the data portion of the PPDU includes wake-up receiver preamble/data based on monitoring the reserved bit in the SIG field or SIG-A field. Thus, in an embodiment, the new wireless device that is in the active mode may decode the wake-up receiver preamble/data if the information therein is needed. Otherwise, the new wireless device does not decode the wake-up receiver preamble/data to save power. Thus, a wake-up receiver can be turned off when the wireless device is in the active mode depending on the implementation. The behavior of the wireless device may be configurable depending on implementation.

A new wireless device that supports wake-up receiver functionality and that is in a power-save mode (e.g., only the wake-up receiver is active, as shown in the left side of FIG. 7) may only be able to decode the wake-up receiver preamble/data (and not the legacy portion of the PPDU) because its main radio is turned off. Depending on the information in the wake-up receiver data, the new wireless device may wake up from the power-save mode (e.g., by waking up the main radio).

By employing the wake-up receiver PPDU format described herein, the power consumption of IEEE 802.11ah wireless devices can be significantly reduced and thus the network operation lifetime can be extended. The proposed wake-up receiver PPDU format is backwards compatible with the legacy IEEE 802.11ah standard. Thus, new wireless devices that support wake-up receiver functionality can coexist with legacy wireless devices, and realize the power saving features to extend the network operation lifetime.

Although the IEEE 802.11ah standard offers several low power features, it is not adequate in some application that requires ultra-low power consumption as well as low latency during the power-save mode. For example, an 802.11ah STA in TIM-based power-save mode wakes up in beacon intervals to listen if a corresponding TIM (Traffic Indication Map) bit is set by the AP. Typically, the beacon interval is configured to be short so the latency is less than a few hundred milliseconds. However, due to the short beacon spacing, the 802.11ah STA has to wake up frequently, resulting in high power consumption. In contrast, in non-TIM-based power-save mode, an 802.11ah STA does not need to wake up every beacon interval. Instead, the 802.11ah STA only needs to send one trigger frame within the listen-interval to fetch the data buffered at the 802.11ah AP. Thus, the 802.11ah STA in non-TIM-based power-save mode can wake up less frequently and save power compared to a STA in TIM-based power-save mode. However, the latency in non-TIM-based power save mode is generally longer than the latency in TIM-based power save mode.

The concept of wake-up receiver may be used to achieve ultra-low power consumption with low latency even when waking up frequently. A wake-up signal sent by an 802.11ah AP may carry the address of the 802.11ah STA whose data is buffered in the 802.11ah AP and commands. Thus, the main 802.11ah RF transceiver, which consumes more power than the wake-up receiver transceiver, does not need to wake up to listen for the S1G beacon frame when the STA is in a power-save mode. Instead, the wake-up receiver transceiver in the 802.11ah STA may periodically wake up to listen for wake-up signals transmitted by the 802.11ah AP.

Figure 19:
FIG. 19 is a diagram showing an example of a wake-up signal transmission, according to some embodiments.

FIG. 19 is a diagram showing an example of a wake-up signal transmission, according to some embodiments. As shown in the diagram, a wake-up signal (including a wake-up receiver preamble 1904 and wake-up receiver data 1906) is transmitted immediately following transmission of a S1G beacon frame 1902 (e.g., as if the wake-up receiver preamble 1904 and the wake-up receiver data 1906 were part of the S1G beacon frame 1902). The S1G beacon frame may be transmitted using a first bandwidth (e.g., ~2 MHz) while the wake-up signal is transmitted using a second bandwidth that is less than the first bandwidth (e.g., less than 2 MHz). In an embodiment, unlike the S1G beacon frame 1902, the wake-up signal is modulated by a simple modulation scheme such as an OOK modulation scheme with repetition (or spreading), which allow the wake-up receiver to be simple and consume ultra-low power to receive the wake-up signal.

Figure 20:
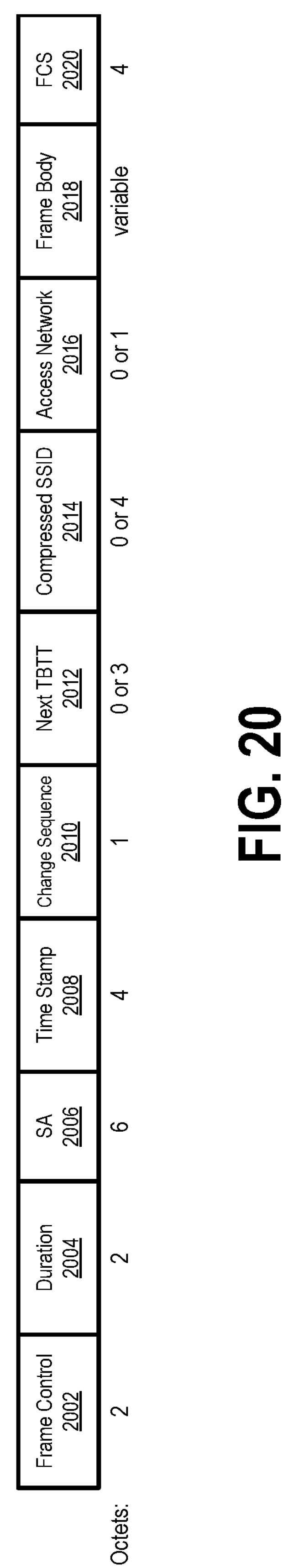
FIG. 20 is a diagram showing S1G beacon frame format, according to some embodiments.

FIG. 20 is a diagram showing S1G beacon frame format, according to some embodiments. As shown in the diagram, the S1G beacon frame format includes a frame control field 2002, a duration field 2004, a SA field 2006, a time stamp field 2008, a change sequence field 2010, a next TBTT field 2012, a compressed SSID field 2014, an access network field 2016, a frame body field 2018, and a FCS field 2020.

When a wake-up signal (including wake-up receiver preamble and data) is transmitted, the legacy 802.11ah wireless devices should defer their transmissions to ensure that the wake-up receivers can receive the wake-up signal securely. In an embodiment, an 802.11ah AP transmitting a wake-up receiver signal uses the duration field 2004 in the S1G beacon frame 1902 to cause legacy 802.11ah wireless devices to defer transmissions during transmission of a wake-up receiver signal. For example, the 802.11ah AP may set the duration field 2004 such that it indicates a combined transmission duration of the S1G beacon frame 1902, the wake-up receiver preamble 1904, and the wake-up receiver data 1906. This may cause other wireless devices that receive the S1G beacon frame 1902 to avoid transmissions for the combined transmission duration indicated in the duration field 2004.

The transmission scheme disclosed herein may significantly reduce power consumption while waking up frequently to lower the latency time during the power-save mode. Also, the wireless devices that support wake-up receiver functionality can coexist with the legacy wireless devices that do not support wake-up receiver functionality because the additional signals (e.g., wake-up receiver preamble and data) do not interfere with the operation of the legacy wireless devices. Thus, legacy wireless devices are compatible with the scheme disclosed herein without any further modifications.

Turning now to FIG. 21, a method 2100 will now be described for transmitting a wake-up receiver PPDU, in accordance with some embodiments. The method 2100 may be performed by one or more devices described herein. For example, the method 2100 may be performed by a first wireless device 104 functioning as an AP in a wireless network.

Although shown in a particular order, in some embodiments the operations of the method 2100 (and the other methods shown in the other figures) may be performed in a different order. For example, although the operations of the method 2100 are shown in a sequential order, some of the operations may be performed in partially or entirely overlapping time periods.

As shown in FIG. 21, the method 2100 may commence at operation 2102 with the first wireless device generating a PPDU that includes a preamble portion and a data portion, wherein the preamble portion of the PPDU includes a signal field, wherein the signal field includes a bit (e.g., a reserved bit) that is set to binary '0' to indicate that the data portion of the PPDU includes a wake-up receiver preamble and wake-up receiver data.

In an embodiment (e.g., where the PPDU corresponds to a S1G_SHORT format), the signal field includes a first signal subfield (e.g., SIG-1) and a second signal subfield (e.g., SIG-1), wherein the bit that is set to binary '0' is bit B0 of the first signal subfield.

In an embodiment (e.g., where the PPDU corresponds to a S1G_LONG format), the PPDU is a SU PPDU, wherein the signal field includes a first signal subfield (e.g., SIG-A-1) and a second signal subfield (e.g., SIG-A-2), wherein the bit that is set to binary '0' is bit B12 of the second signal subfield.

In an embodiment (e.g., where the PPDU corresponds to a S1G_LONG format), the PPDU is a MU PPDU, wherein the signal field includes a first signal subfield (e.g., SIG-A-1) and a second signal subfield (e.g., SIG-A-2), wherein the bit that is set to binary '0' is bit B2 of the first signal subfield and/or bit B1 of the second signal subfield.

In an embodiment (e.g., where the PPDU corresponds to a S1G_1M format), the bit that is set to binary '0' is bit B6 of the signal field.

In an embodiment, the PPDU is wirelessly transmitted in a sub-1 GHz band. In an embodiment, the preamble portion of the PPDU is wirelessly transmitted using a first bandwidth and the data portion of the PPDU is wirelessly transmitted using a second bandwidth that is less than the first bandwidth.

In an embodiment, the data portion of the PPDU is wirelessly transmitted using an on-off keying (OOK) modulation scheme.

In an embodiment, the preamble portion of the PPDU causes a second wireless device (e.g., a legacy wireless device) that receives the preamble portion of the PPDU to avoid wirelessly transmissions for a predicted transmission duration of the PPDU. In an embodiment, the bit being set to binary '0' causes the second wireless device to refrain from decoding the data portion of the PPDU.

At operation 2104, the wireless device wirelessly transmits the PPDU.

Turning now to FIG. 22, a method 2200 will now be described for receiving and processing a wake-up receiver PPDU, in accordance with some embodiments. The method 2200 may be performed by one or more devices described herein. For example, the method 2200 may be performed by a wireless device 104 functioning as a legacy non-AP STA (that does not support wake-up receiver functionality) in a wireless network.

As shown in FIG. 22, the method 2200 may commence at operation 2202 with the wireless device receiving a PPDU that includes a preamble portion and a data portion, wherein the preamble portion of the PPDU includes a signal field that includes a bit (e.g., a reserved bit) that is set to binary '0' to indicate that the data portion of the PPDU includes a wake-up receiver preamble and wake-up receiver data.

At operation 2204, the wireless device refrains from decoding the data portion of the PPDU in response to a determination that the bit is set to binary '0'.

Figure 23:
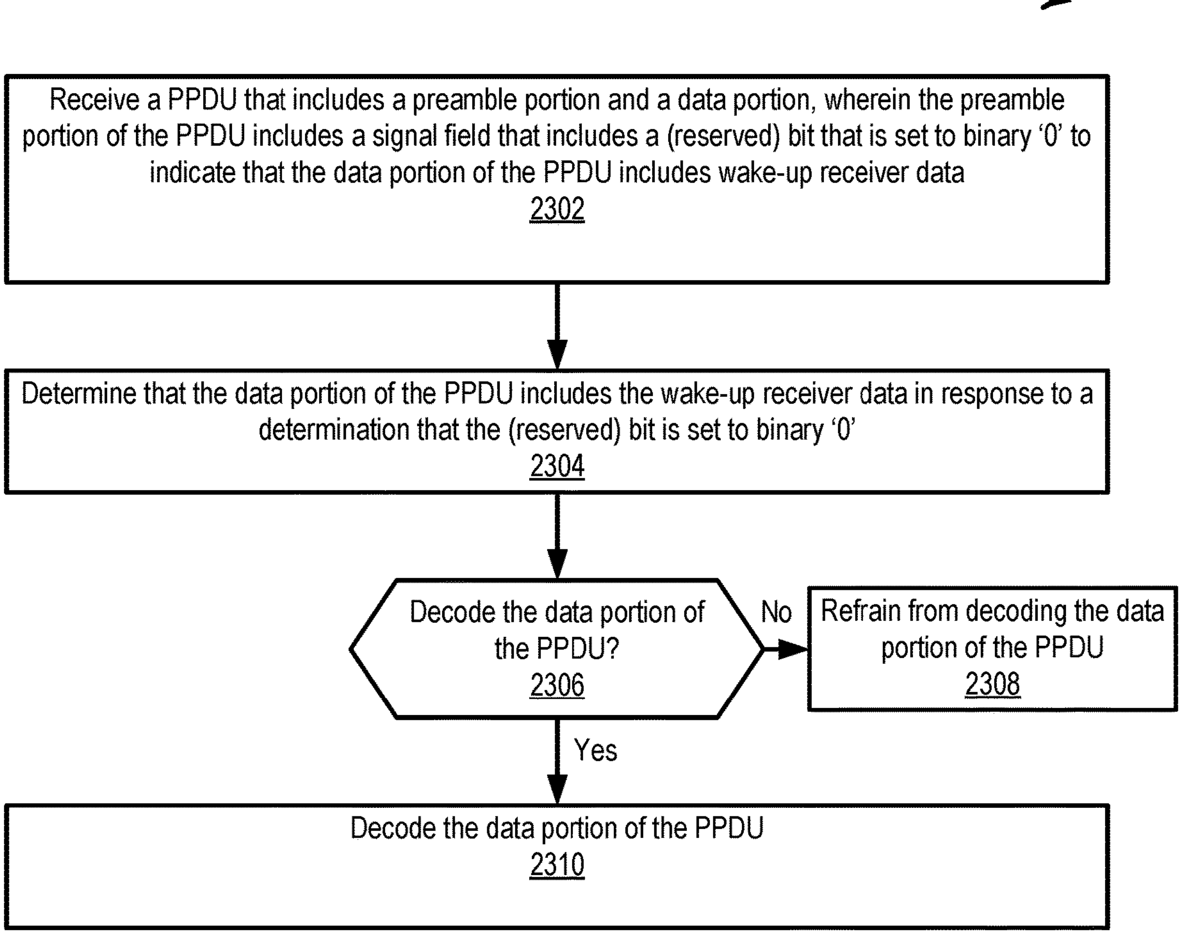
FIG. 23 is a diagram showing another method for receiving and processing a wake-up receiver PPDU, according to some embodiments.

Turning now to FIG. 23, a method 2300 will now be described for receiving and processing a wake-up receiver PPDU, in accordance with some embodiments. The method 2300 may be performed by one or more devices described herein. For example, the method 2300 may be performed by a wireless device 104 functioning as a non-AP STA in a wireless network. The wireless device may support wake-up receiver functionality (e.g., it has a wake-up receiver in addition to a main radio).

As shown in FIG. 23, the method 2300 may commence at operation 2302 with the wireless device receiving a PPDU that includes a preamble portion and a data portion, wherein the preamble portion of the PPDU includes a signal field that includes a bit (e.g., a reserved bit) that is set to binary '0' to indicate that the data portion of the PPDU includes a wake-up receiver preamble and wake-up receiver data.

At operation 2304, the wireless device determines that the data portion of the PPDU includes the wake-up receiver data in response to a determination that the bit is set to binary '0'.

At operation 2306, the wireless device determines whether to decode the data portion of the PPDU. If the wireless device determines that the data portion of the PPDU should not be decoded, then at operation 2308, the wireless device refrains from decoding the data portion of the PPDU. Otherwise, if the wireless device determines that the data portion of the PPDU should be decoded, then at operation 2310, the wireless device decodes the data portion of the PPDU.

Figure 24:
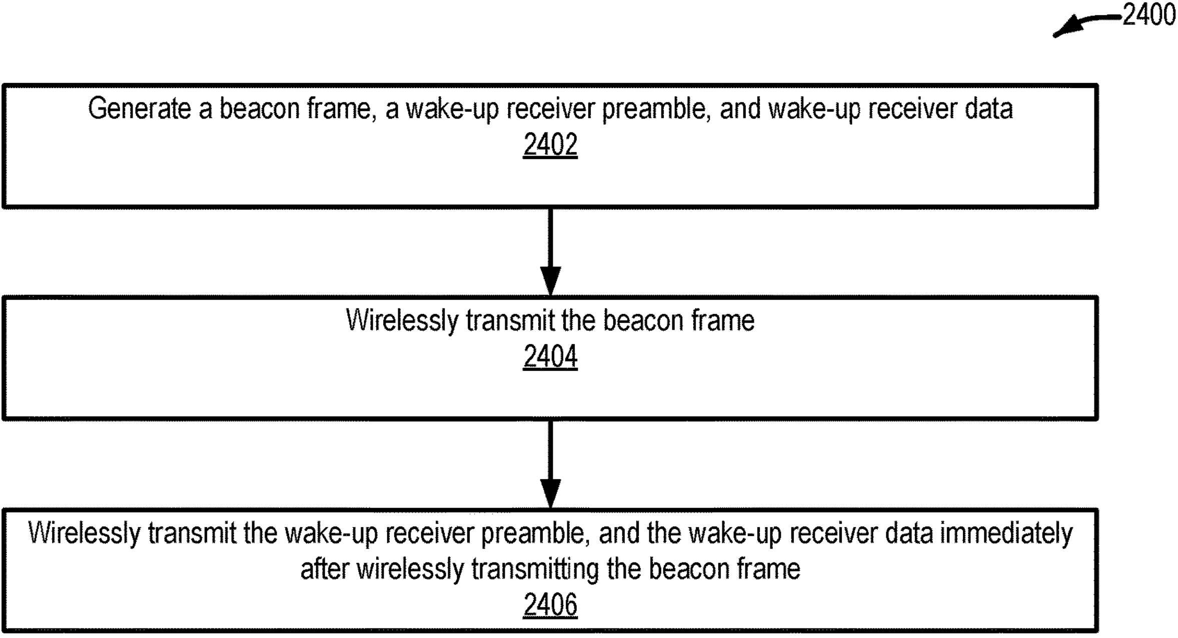
FIG. 24 is a diagram showing a method for transmitting a wake-up signal, according to some embodiments.

Turning now to FIG. 24, a method 2400 will now be described for transmitting a wake-up signal, in accordance with some embodiments. The method 2400 may be performed by one or more devices described herein. For example, the method 2400 may be performed by a wireless device 104 functioning as an AP in a wireless network.

As shown in FIG. 24, the method 2400 may commence at operation 2402 with the wireless device generating a beacon frame (e.g., a S1G beacon frame), a wake-up receiver preamble, and wake-up receiver data.

At operation 2404, the wireless device wirelessly transmits the beacon frame.

At operation 2406, the wireless device wirelessly transmits the wake-up receiver preamble and the wake-up receiver data immediately after transmitting the beacon frame (e.g., as if the wake-up receiver preamble and the wake-up receiver data are part of the beacon frame).

In an embodiment, the beacon frame includes a duration field, wherein the duration field indicates a combined transmission duration of the beacon frame, the wake-up receiver preamble, and the wake-up receiver data, wherein the duration field causes a second wireless device that receives the beacon frame to avoid wireless transmissions for the combined transmission duration of the beacon frame, the wake-up receiver preamble, and the wake-up receiver data.

In an embodiment, the beacon frame, the wake-up receiver preamble, and the wake-up receiver data are wirelessly transmitted in a sub-1 GHz band. In an embodiment, the beacon frame is wirelessly transmitted using a first bandwidth, wherein the wake-up receiver preamble and the wake-up receiver data are transmitted using a second bandwidth that is less than the first bandwidth.

In an embodiment, method 2400 can be used together with method 2100.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a first wireless device operating in a wireless network, the method comprising:

generating a physical layer protocol data unit (PPDU) that includes a preamble portion and a data portion, wherein the preamble portion of the PPDU includes a signal field, wherein the signal field includes a bit that is set to binary '0' to indicate that the data portion of the PPDU includes a wake-up receiver preamble and wake-up receiver data, wherein when the bit included in the signal field is set to binary '1' it indicates that the PPDU is not a wake-up receiver PPDU; and wirelessly transmitting the PPDU.

2. The method of claim 1, wherein the signal field includes a first signal subfield and a second signal subfield, wherein the bit that is set to binary '0' is bit B0 of the first signal subfield.

3. The method of claim 1, wherein the PPDU is a single user (SU) PPDU, wherein the signal field includes a first signal subfield and a second signal subfield, wherein the bit that is set to binary '0' is bit B12 of the second signal subfield.

4. The method of claim 1, wherein the PPDU is a multi-user (MU) PPDU, wherein the signal field includes a first signal subfield and a second signal subfield, wherein the bit that is set to binary '0' is bit B2 of the first signal subfield and/or bit B 1 of the second signal subfield.

5. The method of claim 1, wherein the bit that is set to binary '0' is bit B6 of the signal field.

6. The method of claim 1, wherein the PPDU is wirelessly transmitted in a sub-1 GHz band.

7. The method of claim 6, wherein the preamble portion of the PPDU is wirelessly transmitted using a first bandwidth and the data portion of the PPDU is wirelessly transmitted using a second bandwidth that is less than the first bandwidth.

8. The method of claim 7, wherein the data portion of the PPDU is wirelessly transmitted using an on-off keying (OOK) modulation scheme.

9. The method of claim 1, wherein the preamble portion of the PPDU causes a second wireless device that receives the preamble portion of the PPDU to avoid wirelessly transmissions for a predicted transmission duration of the PPDU.

10. The method of claim 9, wherein the bit being set to binary '0' causes the second wireless device to refrain from decoding the data portion of the PPDU.

11. The method of claim 1, further comprising:

generating a beacon frame, a second wake-up receiver preamble, and second wake-up receiver data;

wirelessly transmitting the beacon frame; and wirelessly transmitting the second wake-up receiver preamble and the second wake-up receiver data immediately after wirelessly transmitting the beacon frame.

12. The method of claim 11, wherein the beacon frame includes a duration field, wherein the duration field indicates a combined transmission duration of the beacon frame, the second wake-up receiver preamble, and the second wake-up receiver data, wherein the duration field causes a second wireless device that receives the beacon frame to avoid wireless transmissions for the combined transmission duration of the beacon frame, the second wake-up receiver preamble, and the second wake-up receiver data.

13. The method of claim 11, wherein the beacon frame, the second wake-up receiver preamble, and the second wake-up receiver data are wirelessly transmitted in a sub-1 GHz band.

14. The method of claim 13, wherein the beacon frame is wirelessly transmitted using a first bandwidth, wherein the wake-up receiver preamble and the wake-up receiver data are transmitted using a second bandwidth that is less than the first bandwidth.

15. A method performed by a first wireless device operating in a wireless network, the method comprising:

receiving a physical layer protocol data unit (PPDU) that includes a preamble portion and a data portion, wherein the preamble portion of the PPDU includes a signal field that includes a bit that is set to binary '0' to indicate that the data portion of the PPDU includes wake-up receiver data, wherein when the bit included in the signal field is set to binary '1' it indicates that the PPDU is not a wake-up receiver PPDU; and refraining from decoding the data portion of the PPDU in response to a determination that the signal field includes the bit that is set to binary '0'.

16. A first wireless device that is to operate in a wireless network, the first wireless device comprising:

a radio frequency transceiver;

a memory device storing a set of instructions; and a processor coupled to the memory device, wherein the set of instructions when executed by the processor causes the first wireless device to:

generate a physical layer protocol data unit (PPDU) that includes a preamble portion and a data portion, wherein the preamble portion of the PPDU includes a signal field, wherein the signal field includes a bit that is set to binary '0' to indicate that the data portion of the PPDU includes a wake-up receiver preamble and wake-up receiver data, wherein when the bit included in the signal field is set to binary '1' it indicates that the PPDU is not a wake-up receiver PPDU; and wirelessly transmit the PPDU via the radio frequency transceiver.

17. The first wireless device of claim 16, wherein the signal field includes a first signal subfield and a second signal subfield, wherein the bit that is set to binary '0' is bit B0 of the first signal subfield.

18. The first wireless device of claim 16, wherein the preamble portion of the PPDU causes a second wireless device that receives the preamble portion of the PPDU to avoid wirelessly transmissions for a predicted transmission duration of the PPDU.

19. The first wireless device of claim 18, wherein the bit being set to binary '0' causes the second wireless device to refrain from decoding the data portion of the PPDU.

20. The first wireless device of claim 16, wherein the set of instructions when executed by the processor further causes the first wireless device to:

generate a beacon frame, a second wake-up receiver preamble, and second wake-up receiver data;

wirelessly transmit the beacon frame via the radio frequency transceiver; and wirelessly transmit the second wake-up receiver preamble and the second wake-up receiver data via the radio frequency transceiver immediately after wirelessly transmitting the beacon frame.

* * * * *